(12) United States Patent
Wipplinger et al.

(10) Patent No.: US 8,188,891 B2
(45) Date of Patent: May 29, 2012

(54) METHOD AND SYSTEM FOR DEPICTING VISUALLY PREDOMINANT FEATURES ON A FLIGHT DISPLAY

(75) Inventors: Patrick Wipplinger, Moerfelden-Walldorf (DE); Andreas Sindlinger, Weinheim (DE); Jason Clark, Evergreen, CO (US)

(73) Assignee: The Boeing Company, Chicago, IL (US)

( * ) Notice: Subject to any disclaimer, the term of this patent is extended or adjusted under 35 U.S.C. 154(b) by 351 days.

(21) Appl. No.: 12/250,136

(22) Filed: Oct. 13, 2008

(65) Prior Publication Data

US 2010/0090869 A1   Apr. 15, 2010

(51) Int. Cl.
*G01C 21/00*   (2006.01)
(52) U.S. Cl. .............................. 340/977; 701/4; 701/214
(58) Field of Classification Search ................... 340/945, 340/973, 974, 977, 980; 701/4, 300, 301
See application file for complete search history.

(56) References Cited

U.S. PATENT DOCUMENTS

| | | | |
|---|---|---|---|
| 5,208,590 A * | 5/1993 | Pitts | 340/973 |
| 6,621,494 B2 * | 9/2003 | Matsuoka et al. | 345/427 |
| 6,970,107 B2 * | 11/2005 | Gannett | 340/967 |
| 7,098,809 B2 * | 8/2006 | Feyereisen et al. | 340/963 |
| 7,352,292 B2 * | 4/2008 | Alter et al. | 340/945 |
| 2002/0080145 A1 * | 6/2002 | Ishihara | 345/589 |
| 2002/0113720 A1 * | 8/2002 | Derderian | 340/965 |
| 2007/0005199 A1 * | 1/2007 | He | 701/16 |
| 2007/0146364 A1 | 6/2007 | Aspen | 345/426 |
| 2007/0150125 A1 | 6/2007 | Aspen | 701/3 |
| 2007/0168122 A1 | 7/2007 | Aspen | 701/211 |

OTHER PUBLICATIONS

Hollis et al., "Vehicle Routing and Crew Scheduling for Metropolitan Mail Distribution at Australia Post", European Journal of Operational Research, vol. 173, pp. 133-150, 2006.
Chen et al., "The First K Minimum Cost Paths in a Time-Schedule Network", Palgrave Macmillan Journals and Operational Research Society, vol. 52, No. 1, Jan. 2001, pp. 102-108.

* cited by examiner

*Primary Examiner* — George Bugg
*Assistant Examiner* — Edny Labbees
(74) *Attorney, Agent, or Firm* — Caven & Aghevli LLC

(57) ABSTRACT

The system for presenting visual features to a pilot of an aerial vehicle contains a flight display. The flight display includes a display screen, a programmable device, an input device, and a memory. A plurality of visual features is contained in the memory. A plurality of feature characteristics is contained in the memory. Each of the feature characteristics is linked to at least one of the features. An environmental device communicates with the input device. The environmental device inputs an approximately present environmental condition of the aerial vehicle to the input device. The programmable device compares the approximately present environmental condition to the feature characteristics to determine which of the features stored in the memory to display on the flight display.

20 Claims, 7 Drawing Sheets

METHOD AND SYSTEM FOR DEPICTING VISUALLY PREDOMINANT FEATURES ON A FLIGHT DISPLAY

FIELD OF THE DISCLOSURE

The present disclosure is generally related to a mapping system. The disclosure has particular utility as a mapping system for a flight display on an aerial vehicle and will be described in connection with such utility, although other utilities are contemplated.

BACKGROUND OF THE DISCLOSURE

Pilots flying under Visual Flight Rules (VFR) navigate by comparing features visible through the cockpit window with the features displayed on a paper chart and/or an electronic map. FIG. 1 is an illustration of an exemplary map 11 appearance, in accordance with the known art. Features may include towers, roads, lakes, etc. Many of the features can be useful in some circumstances and not in others. Without knowing which features a pilot will wish to utilize, every possibly useful feature is included in the paper chart and electronic map 11. However, currently employed paper charts and electronic maps 11 frequently have so many features, that distinguishing the useful features may require increased pilot awareness and workload.

Thus, a heretofore unaddressed need exists in the industry to provide a map with useful features while avoiding cluttering features.

SUMMARY OF THE DISCLOSURE

Embodiments of the present disclosure provide a system and method for presenting visual features to a pilot of a vehicle such as an aerial vehicle. Briefly described, in architecture, one embodiment of the system, among others, can be implemented as follows. The system contains a flight display. The flight display includes a display screen, a programmable device, an input device, and a memory. A plurality of visual features is contained in the memory. A plurality of feature characteristics is contained in the memory. Each of the feature characteristics is linked to at least one of the visual features. An environmental device communicates with the input device. The environmental device inputs an approximately present environmental condition of the aerial vehicle to the input device. The programmable device compares the approximately present environmental condition to the feature characteristics to determine which of the visual features stored in the memory to display on the flight display.

The present disclosure can also be viewed as providing methods for presenting visual features to a pilot of a vehicle such as an aerial vehicle. In this regard, one embodiment of such a method, among others, can be broadly summarized by the following steps: providing a map for the aerial vehicle on a display screen; sensing an approximately present environmental condition of the aerial vehicle; communicating the approximately present environmental condition to a programmable device; comparing the approximately present environmental condition to a plurality of feature characteristics, the feature characteristics linked to a plurality of visual features, to determine which of the plurality of visual features stored in a memory to display on the flight display; and electronically displaying a subset of the plurality of visual features on the map.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The features, functions, and advantages that have been discussed can be achieved independently in various embodiments of the present disclosure or may be combined in yet other embodiment further details of which can be seen with reference to the following description and drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 2:
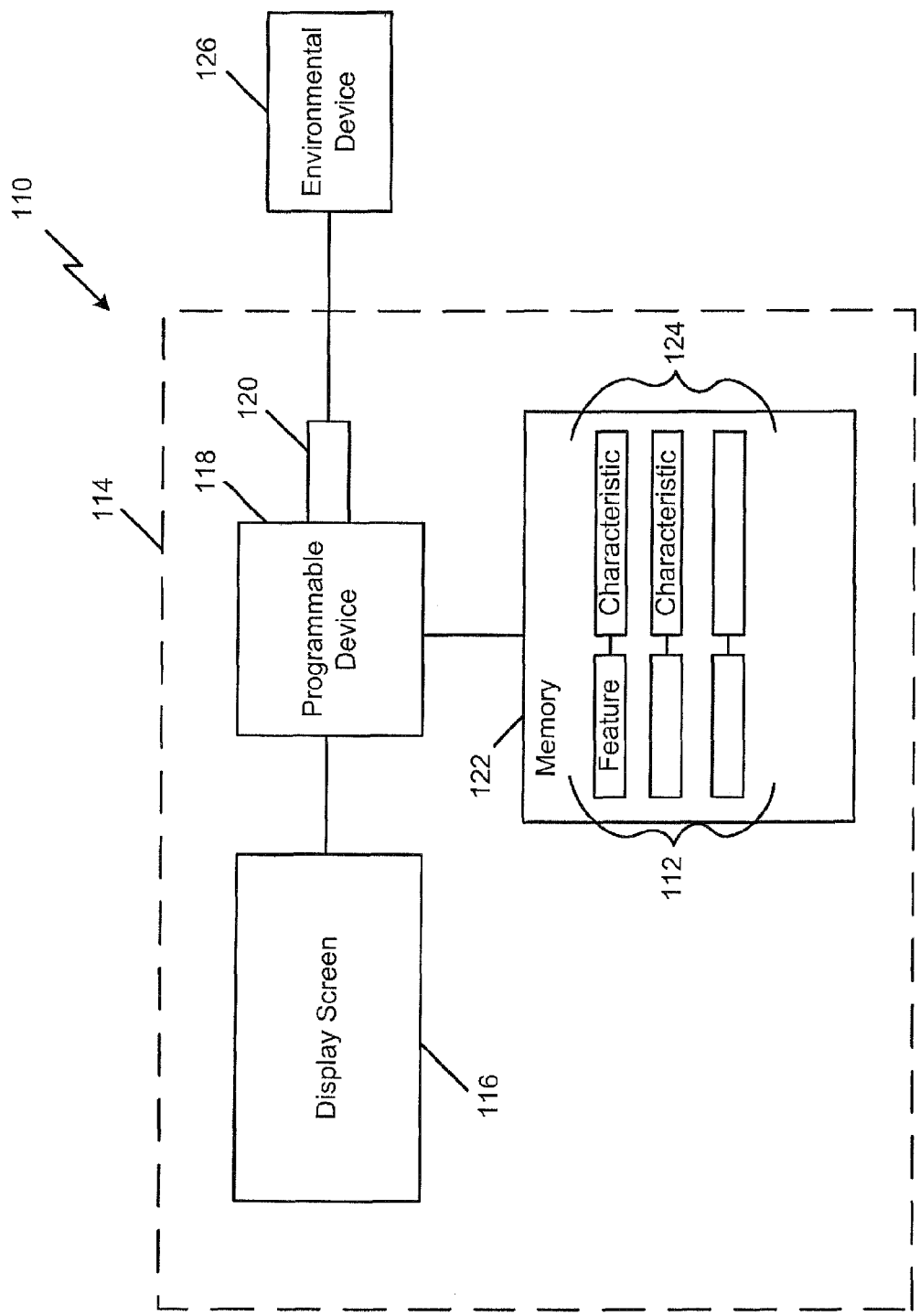
FIG. 2 is an illustration of a block diagram of a system for presenting visual features to a pilot of an aerial vehicle, in accordance with a first exemplary embodiment of the disclosure.

FIG. 2 is an illustration of a block diagram of a system 110 for presenting visual features 112 to a pilot of an aerial vehicle, in accordance with a first exemplary embodiment of the present disclosure. The system 110 for presenting visual features 112 to a pilot of an aerial vehicle contains a flight display 114. The flight display 114 includes a display screen 116, a programmable device 118, an input device 120, and a memory 122. A plurality of visual features 112 is contained in the memory 122. A plurality of feature characteristics 124 is contained in the memory 122. Each of the feature characteristics 124 is linked to at least one of the visual features 112. An environmental device 126 communicates with the input device 120. The environmental device 126 inputs an approximately present environmental condition of the aerial vehicle to the input device 120. The programmable device 118 compares the approximately present environmental condition to the feature characteristics 124 to determine which of the visual features 112 stored in the memory 122 to display on the flight display 114.

The visual features 112 may be natural terrain features, including, but not limited to mountains, lakes, rivers, ocean shores, etc. The visual features 112 may also be man-made features, including, but not limited to tall buildings, airports, stadiums, highways, etc. The visual features 112 may also be spans between objects, including, but not limited to, spans between two mountain peaks, gaps between an oil rig and a shore line, distances between a river and a cusp of a city, etc. The visual features 112 may be any visually distinguishable elements that may aid an individual piloting the aerial vehicle get their bearings and may include any visual features 112 known to those having ordinary skill in the art.

The flight display 114 includes the display screen 116, the programmable device 118, the input device 120, and the memory 122. The display screen 116 may be any device used to convey visual information to an individual and may provide two-dimensional or three-dimensional information. The display screen 116 may not necessarily be a device dedicated to the flight display 114, but may be used by the pilot for similar and/or unrelated information concurrent with the flight display 114 or while the flight display 114 is not in use. The programmable device 118 may be any device usable for carrying out programmed comparisons and/or calculations, including, but not limited to, a computer processor. The programmable device 118 may be, but is not required to be, physically connected to the display screen 116, the input device 120, and/or the memory 122. The programmable device 118 may be, but is not required to be, aboard the aerial vehicle.

The input device 120 is positioned at least to receive information from the environmental device 126 for the programmable device 118. The input device 120 may be in wired or wireless communication with each of the environmental device 126 and the programmable device 118. The language of communication may be any known to those having ordinary skill in the art. The memory 122 is capable of storing information, at least including the visual features 112 and the feature characteristics 124. The memory 122 is in communication with the programmable device 118 at least to a level as is necessary to allow the programmable device 118 to access data stored in the memory 122.

The feature characteristics 124 and the environmental device 126 share a symbiotic relationship in that the feature characteristics 124 are at least partially based on the anticipated form of information to be produced by the environmental device 126. More specifically, depending on the time of day, the weather, and the speed, altitude, and position of the aerial vehicle, some visual features 112 may be useful flying under visual flight rules, while others are not. The environmental device 126 may be used to detect information about one or more of these or other environmental characteristics useful to visual flight rules. The feature characteristics 124 may be used to define which visual features 112 are useful dependant on at least one environmental characteristic on which the environmental device 126 may be expected to produce information.

As an example, the environmental device 126 may be an altimeter or similar device for measuring altitude. The altimeter is useful for determining a distance the aerial vehicle is above sea level and, with an additional calculation, above the ground. Various visual features 112 may become difficult to detect at higher altitudes while other visual features 112 may be harder to detect or less useful at lower altitudes. Thus, the feature characteristics 124 for the visual features 112 may include an altitude at which the visual features 112 are predominant and/or distinguishable. The programmable device 118 may compare the output of the environmental device 126, an altitude, to the feature characteristics 124 and display only the distinguishable visual features 112 on the display screen 116. The programmable device 118 may also display a restricted number of visual features on the flight display. For example, the programmable device 118 may also limit the displayed visual features 112 to a finite count or quota and simply choose the most distinguishable visual features 112 until that quota is met and display those visual features 112. This quota may be a predetermined fixed limit or may be based on a current environmental characteristic.

Figure 1:
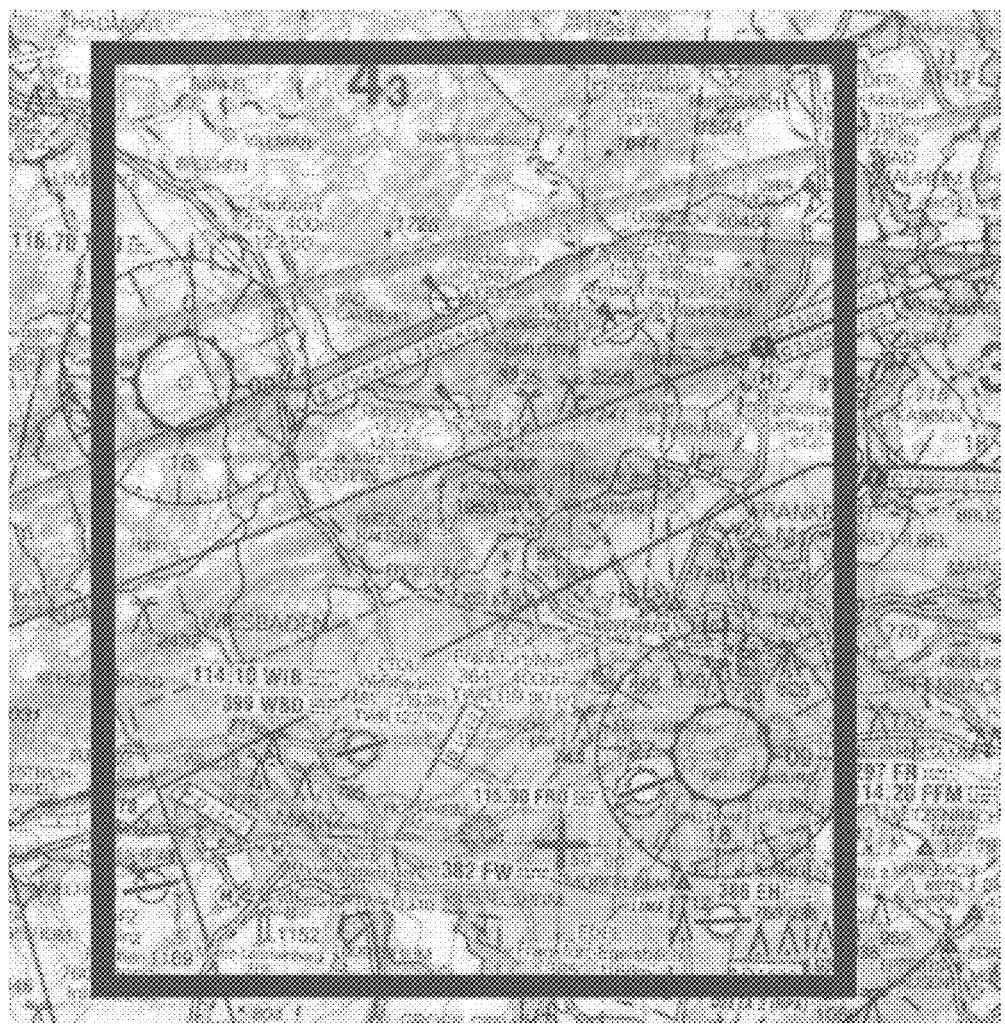
FIG. 1 is an illustration of an exemplary map appearance, in accordance with the known art.
Figure 3:
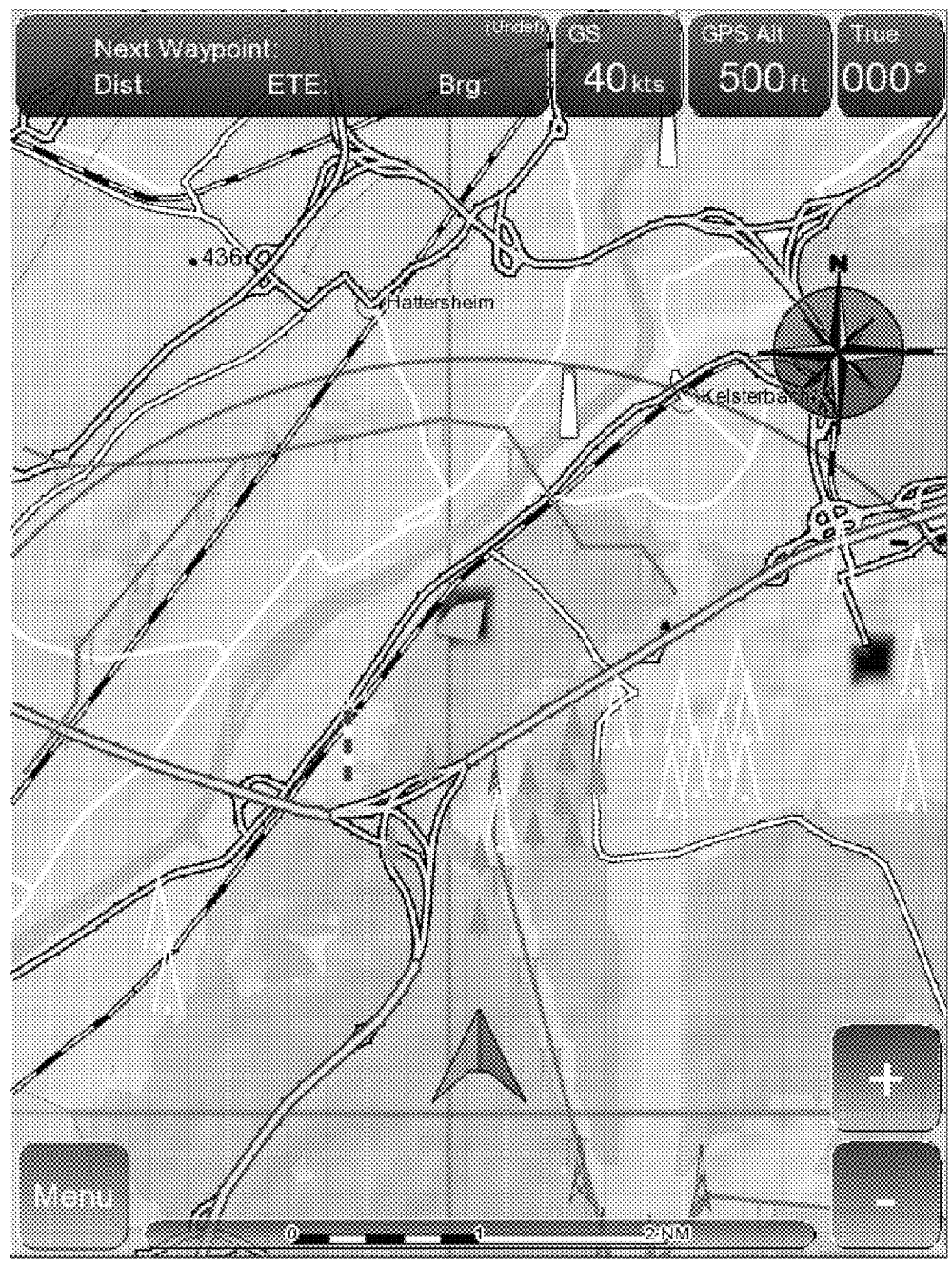
FIG. 3 is an illustration of a map utilizing the system for presenting visual features to a pilot of an aerial vehicle, in accordance with a first exemplary embodiment of the disclosure.

FIG. 3 is an illustration of a map 111A utilizing the system for presenting visual features to a pilot of an aerial vehicle, in accordance with a first exemplary embodiment of the disclosure. The map 111A shown in FIG. 3 is taken from a geographic region within a space shown in FIG. 1. The map 111A is representative of useful features for an aerial vehicle traveling with an altitude of five hundred feet. Visual features 112 may include power lines, forests, some lakes, and roadways, which include on-ramps and off-ramps.

Figure 4:
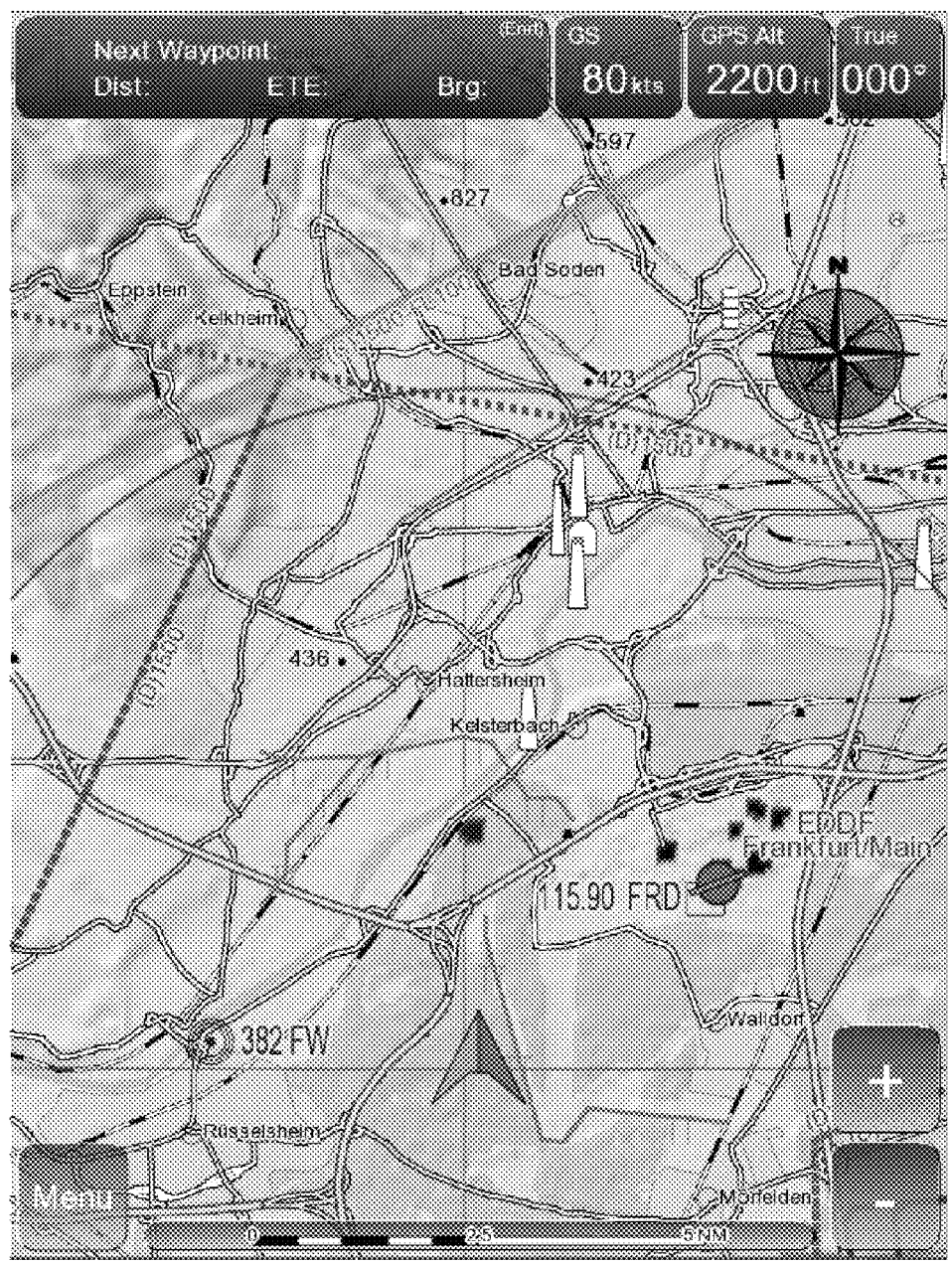
FIG. 4 is an illustration of a map utilizing the system for presenting visual features to a pilot of an aerial vehicle, in accordance with a first exemplary embodiment of the disclosure.

FIG. 4 is an illustration of a map 111B utilizing the system for presenting visual features to a pilot of an aerial vehicle, in accordance with a first exemplary embodiment of the disclosure. The map 111B shown in FIG. 4 is taken from a geographic region within a space shown in FIG. 1 and includes the space shown in FIG. 3. The map 111B is representative of useful features for an aerial vehicle traveling with an altitude of twenty-two hundred feet. Visual features 112 may include power lines, roadways, and forests, which have been understated compared to the map 111A in FIG. 3. Lakes are not visible in FIG. 4 because, while some lakes may be perceived from 2200 feet, the lakes in this particular region are not believed to be usefully perceptible. FIG. 4 also encompasses a wider viewing range than FIG. 3, as may be perceived from a higher altitude.

Figure 5:
FIG. 5 is an illustration of a map utilizing the system for presenting visual features to a pilot of an aerial vehicle, in accordance with a first exemplary embodiment of the disclosure.

FIG. 5 is an illustration of a map 111C utilizing the system for presenting visual features to a pilot of an aerial vehicle, in accordance with a first exemplary embodiment of the disclosure. The map 111C shown in FIG. 5 is taken from a geographic region within a space shown in FIG. 1 and includes the space shown in FIG. 3 and FIG. 4. The map 111C is representative of useful features for an aerial vehicle traveling with an altitude of five thousand feet. Visual features 112 may include power lines, roadways, and forests, which have been understated compared to the map 111A, 111B in FIG. 3 and FIG. 4. In particular, the on-ramps and off-ramps and minor roadways are no longer usefully perceptible and thus are no longer shown as visual features 112. FIG. 5 also encompasses a wider viewing range than FIG. 4, as may be perceived from a higher altitude.

Figure 6:
FIG. 6 is an illustration of a map utilizing the system for presenting visual features to a pilot of an aerial vehicle, in accordance with a first exemplary embodiment of the disclosure.

FIG. 6 is an illustration of a map 111D utilizing the system for presenting visual features to a pilot of an aerial vehicle, in accordance with a first exemplary embodiment of the disclosure. The map 111D shown in FIG. 6 is taken from a geographic region resembling a space shown in FIG. 1 and includes the space shown in FIG. 3, FIG. 4, and FIG. 5. The map 111D is representative of useful features for an aerial vehicle traveling with an altitude of eight thousand feet. Visual features 112 may include power lines, roadways, and forests, which have been understated compared to the map 111A, 111B, 111C in FIG. 3, FIG. 4, and FIG. 5. FIG. 6 also encompasses a wider viewing range than FIG. 5, as may be perceived from a higher altitude.

Many of the visual features 112 may become less distinguishable or undistinguishable because a distance from the aerial vehicle to the feature is so great so as to exceed the visual acuity of the pilot. The feature characteristics 124 may include an altitude of the visual features 112, a geographic position of the visual features 112, and dimensional information of the visual features 112. The environmental device 126 may include a geographic position of the aerial vehicle and the altitude of the aerial vehicle such that the programmable device 118 can calculate a distance between the visual feature 112 and the aerial vehicle. If the distance exceeds the proximity required for an individual to detect a visual feature 112 having the dimensions stored with the feature characteristics 124, the visual feature 112 may be excluded from the visual features 112 shown on the display screen 116.

The environmental device 126 may further include technology to obtain meteorological information that may affect visual acuity. For example, rain or fog may diminish a pilot's perception of visual features 112. Displaying visual features 112 that the pilot cannot perceive is counterproductive. Thus, the programmable device 118 may alter the visual features 112 shown on the display screen 116 to show only those visual features 112 most likely to be perceived in poor weather.

Similarly, the environmental device 126 may include a clock and/or light sensors to determine the availability of sunlight and/or moonlight. Some visual features 112, such as rivers, may be imperceptible at nighttime, particularly if moonlight is limited. The feature characteristics 124 may include the hours the visual feature 112 would be more or less perceptible by a pilot and/or the level of perception of the visual feature 112 at various levels of natural light. Some visual features 112, such as airports, buildings, and highways may be more perceptible in the evening because of the lights associated with those objects.

The environmental device 126 may include an aircraft compass and a geographic positioning device. The aircraft compass may input a direction the aerial vehicle is facing into the input device 120 for the programmable device 118. The programmable device 118 may then determine which visual features 112 are visible through a cockpit window based on a position and direction of the aerial vehicle. The programmable device 118 may calculate an angular range of visibility for the pilot and only display on the display screen 116 those visible features 112 that are within the angular range of visibility for the pilot, relative to the cockpit window. While the present disclosure repeatedly discusses the pilot looking through the cockpit window, the pilot may be remotely piloting the aerial vehicle and follow visual flight rules through the use of a camera aboard the aerial vehicle. Thus, remotely piloted aerial vehicles are considered to be within the scope of the present disclosure.

The display screen 116 may advance an image as the aerial vehicle progresses along its course. Specifically, the environmental condition(s) sensed may change over time and the geographic position of the aerial vehicle may be expected to change over time, such that some visual features 112 will become more perceptible while others become less perceptible. Thus the programmable device 118 may be programmed to update the display screen 116 periodically or continuously as the aerial vehicle moves. If periodically, the updates may be a function of time, distance, or simply as material changes occur in the sensed environmental conditions.

Figure 7:
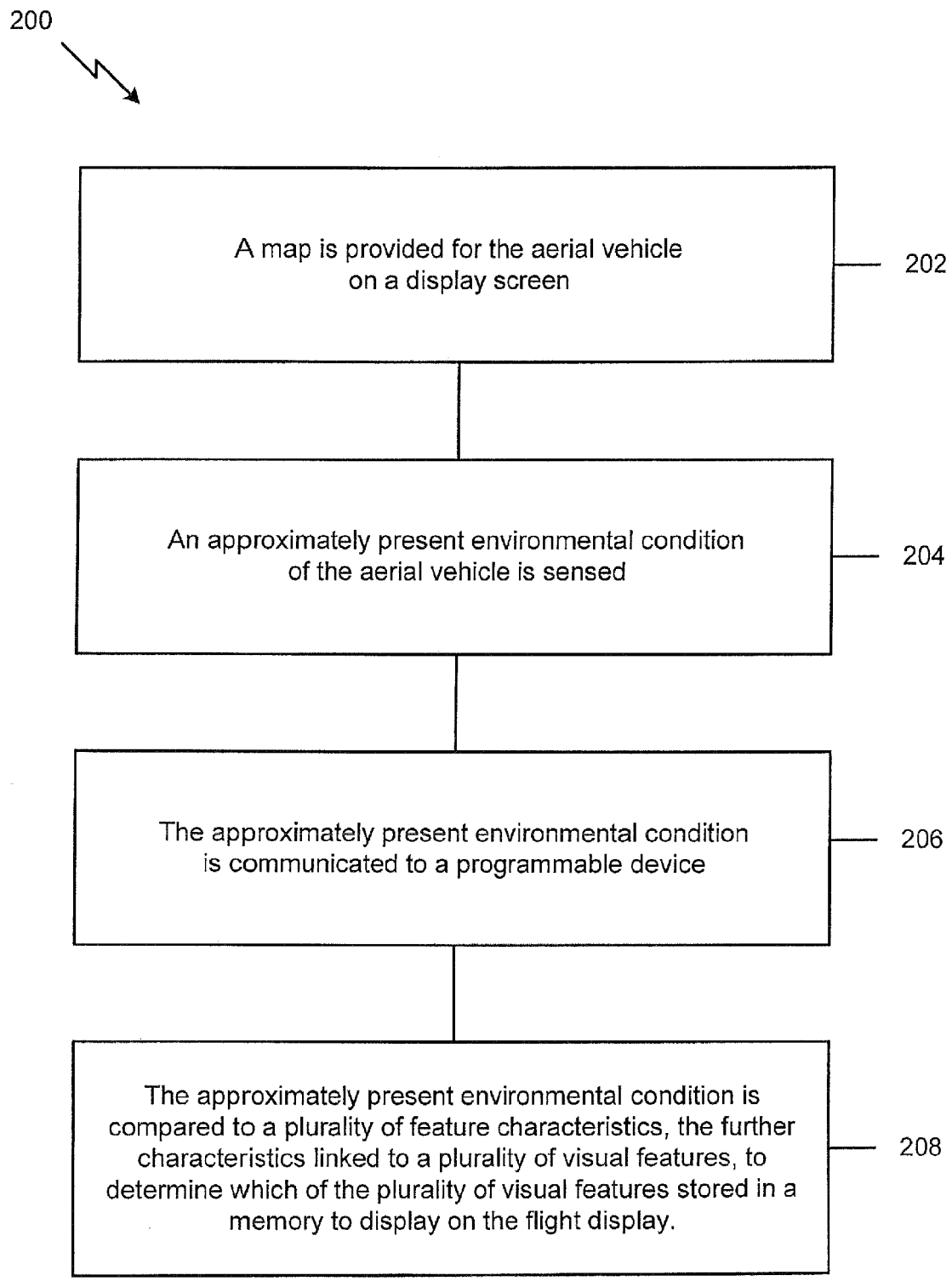
FIG. 7 is a flowchart illustrating a method for presenting visual features to a pilot of an aerial vehicle, in accordance with the first exemplary embodiment of the present disclosure.

FIG. 7 is a flowchart 200 illustrating a method for presenting visual features 112 to a pilot of an aerial vehicle, in accordance with the first exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a map 111 is provided for the aerial vehicle on a display screen. An approximately present environmental condition of the aerial vehicle is sensed (block 204). For example, sensing may include one or more of the following: sensing an altitude of the vehicle, sensing an amount of available natural light exterior to the aerial vehicle, sensing visually impairing weather conditions, and sensing a position of the aerial vehicle relative to the visual features. The approximately present environmental condition is communicated to a programmable device (block 206). The approximately present environmental condition is compared to a plurality of feature characteristics, the feature characteristics linked to a plurality of visual features, to determine which of the plurality of visual features stored in a memory to display on the flight display (block 208). A subset of the plurality of visual features is electronically displayed on the map 11.

It should be emphasized that the above-described embodiments of the present disclosure, particularly, any "preferred" embodiments, are merely possible examples of implementations, merely set forth for a clear understanding of the principles of the disclosure. While an exemplary embodiment is used during Visual Flight Rule (VFR) flight, the invention is also particularly useful during Instrument Flight Rule (IFR) flight as the pilot is often searching for predominant features during periods of limited visibility. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A system to present visual features of a geographic region on a display module of an aircraft, the system comprising:
   a flight display, the flight display including a display screen, a programmable device, an input device, and a memory;
   visual feature data relating to a plurality of visual features in the geographic area contained in the memory;
   feature characteristic data relating to a plurality of feature characteristics associated with the visual features contained in the memory; and
   an environmental device in communication with the input device, wherein the environmental device inputs an environmental condition associated with the aerial vehicle to the input device,
   wherein the programmable device compares the environmental condition to the feature characteristic data associated with visual features in the geographic region to selectively display visual features in the geographic region on the flight display.

2. The system of claim 1, wherein the vehicle comprises an aerial vehicle, and the environmental device further comprises an altimeter and the feature characteristics further comprises altitudes at which the visual features are materially visibly distinguishable, whereby the programmable device only shows distinguishable visual features on the display screen.

3. The system of claim 1, wherein the vehicle comprises an aerial vehicle, and the environmental device further comprises an altimeter and the feature characteristics further comprise altitudes of the visible features, whereby the programmable device calculates a distance between the visual features and the aerial vehicle to determine which visual features are distinguishable and only shows distinguishable visual features on the display screen.

4. The system of claim 1, wherein the vehicle comprises an aerial vehicle, and the environmental device further comprises an altimeter and the feature characteristics further comprise dimensions of the visible features, whereby the programmable device calculates a distance between the visual features and the aerial vehicle as compared to the dimensions of the visual features to determine which visual features are distinguishable and only shows distinguishable visual features on the display screen.

5. The system of claim 1, wherein the environmental device further comprises a clock and the feature characteristics further comprise at which hours the visual features are materially visibly distinguishable, whereby the programmable device only shows distinguishable visual features on the display screen.

6. The system of claim 1, wherein the programmable device compares the approximately present environmental condition to the feature characteristics to determine which of the visual features stored in the memory are most predominant and displays a restricted number of visual features on the flight display.

7. The system of claim 1, wherein the vehicle comprises an aerial vehicle, and the environmental device further comprises:
   a positioning device inputting a position of the aerial vehicle to the input device; and
   an aircraft compass inputting a direction of the aerial vehicle to the input device, whereby the programmable device only shows visual features viewable through a cockpit window, having the position and direction of the aerial vehicle, on the display screen.

8. A method to present visual features of a geographic region on a display module of a vehicle, the method comprising:
   providing a map of the geographic region on a display screen, wherein the map comprises a plurality of visible features in the geographic region;
   sensing an environmental condition associated with the aerial vehicle;
   communicating the approximately present environmental condition to a programmable device;
   comparing, in the programmable device, the environmental condition to feature characteristic data associated with a plurality of feature characteristics, the feature characteristics linked to the plurality of visual features in the geographic region, to selectively display visual features in the geographic region on a map on the flight display.

9. The method of claim 8, wherein the vehicle comprises an aerial vehicle, further comprising:
   detecting, in the environmental device, an altitude of the aerial vehicle
   comparing, in the programmable device, the altitude of the aerial vehicle with feature characteristic data associated with visual features in the geographic region; and
   displaying on the map only those visual features which are distinguishable at the altitude of the aerial vehicle.

10. The method of claim 9, wherein the vehicle comprises an aerial vehicle, further comprising:
   comparing, in the programmable device, the altitude of the aerial vehicle with an altitude associated with visual features in the geographic region; and
   displaying on the map only those visual features which are distinguishable the altitude of the aerial vehicle.

11. The method of claim 8, wherein the vehicle comprises an aerial vehicle, further comprising sensing an amount of available natural light exterior to the aerial vehicle.

12. The method of claim 8, wherein vehicle comprises an aerial vehicle, and the further comprising calculating distances between the visual features and the aerial vehicle.

13. The method of claim 8, further comprising sensing visually impairing weather conditions proximate the vehicle.

14. The method of claim 8, wherein the vehicle comprises an aerial vehicle, and further comprising sensing a position of the aerial vehicle relative to the visual features.

15. The method of claim 8, further comprising calculating an angular range of visibility for the pilot.

16. The method of claim 8, further comprising limiting a number of the visual features shown on the display screen to a predetermined fixed limit.

17. A system to present visual features of a geographic region on a display module of an aircraft, the system comprising:
   means for providing a map of the geographic region on a display of the aerial vehicle;
   means for sensing an environmental condition associated with the aerial vehicle;
   means for communicating the approximately present environmental condition to a programmable device; and
   means for comparing, in the programmable device, the environmental condition to feature characteristic data associated with a plurality of feature characteristics, the feature characteristics linked to the plurality of visual features in the geographic region, to selectively display visual features in the geographic region on a map on the flight display.

18. The system of claim 17, wherein the vehicle comprises an aerial vehicle, and further comprising a means for determining a distance between the aerial vehicle and each of the visual features.

19. The system of claim 17, wherein the means for sensing further comprises a means for sensing an availability of natural light.

20. The system of claim 17, wherein the vehicle comprises an aerial vehicle, and the means for sensing further comprises a means for sensing an altitude of the aerial vehicle.

* * * * *